US012684646B2

(12) United States Patent
Choi et al.

(10) Patent No.: US 12,684,646 B2
(45) Date of Patent: Jul. 14, 2026

(54) TRIGGERING RECONFIGURATION OF A WI-FI NETWORK USING RADIO RESOURCE MANAGEMENT(RRM) CONVERGENCE

(71) Applicant: Cisco Technology, Inc., San Jose, CA (US)

(72) Inventors: Young Il Choi, San Jose, CA (US); Vishal S Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 496 days.

(21) Appl. No.: 18/310,682

(22) Filed: May 2, 2023

(65) Prior Publication Data

US 2024/0373491 A1 Nov. 7, 2024

(51) Int. Cl.
*H04W 76/20* (2018.01)
*H04W 24/02* (2009.01)
*H04W 84/12* (2009.01)

(52) U.S. Cl.
CPC ........... *H04W 76/20* (2018.02); *H04W 24/02* (2013.01); *H04W 84/12* (2013.01)

(58) Field of Classification Search
CPC ................................................. H04W 74/002
See application file for complete search history.

(56) References Cited

U.S. PATENT DOCUMENTS

| | | | | | |
|---|---|---|---|---|---|
| 6,792,106 | B1 * | 9/2004 | Liu | ........................ | H04B 3/234 |
| | | | | | 379/406.01 |
| 9,894,550 | B2 * | 2/2018 | Jung | .................... | H04W 24/02 |
| 10,104,555 | B2 * | 10/2018 | Dain | ................. | H04W 72/0453 |
| 11,778,479 | B2 * | 10/2023 | Kumar | .................. | H04W 24/10 |
| | | | | | 370/329 |
| 2009/0324260 | A1 * | 12/2009 | Andou | .............. | G03G 15/0863 |
| | | | | | 399/13 |
| 2017/0273125 | A1 * | 9/2017 | Teyeb | ................. | H04W 72/542 |
| 2018/0324888 | A1 * | 11/2018 | Shi | ........................ | H04W 76/27 |
| 2022/0174608 | A1 * | 6/2022 | Laselva | ................. | H04W 24/08 |

(Continued)

FOREIGN PATENT DOCUMENTS

| | | | | | |
|---|---|---|---|---|---|
| WO | WO-2021203380 A1 * | 10/2021 | | ............... | H04L 5/00 |

OTHER PUBLICATIONS

El-Mougy A., et al., "Reconfigurable Wireless Networks", arxiv.org, Cornell University Library, 201 Olin Library Cornell University Ithaca, NY 14853, arXiv:1409.6001v1 [cs.NI], Sep. 21, 2014, XP081391790, DOI: 10.1109/JPROC.2014.2376812, p. 15, left-hand column, p. 19, right-hand column, p. 21, left-hand column, pp. 1-28.

(Continued)

*Primary Examiner* — Guang W Li
(74) *Attorney, Agent, or Firm* — Polsinelli P.C.

(57) ABSTRACT

A system is configured to provide a self-healing-based auto radio resource management (RRM) tuning of a network that allows for a closed-loop and domain specific transition from steady state, or a maintenance, mode to a startup, or a configuration, mode depending on the health score of the network. The ability to switch between network state modes seamlessly upon determining when a startup mode is necessary to improve performance based on the monitoring of a health score, through the monitoring and tracking of the overall network health and performance.

20 Claims, 8 Drawing Sheets

WIRELESS NETWORK 200

(56) References Cited

U.S. PATENT DOCUMENTS

| | | | |
|---|---|---|---|
| 2022/0256632 A1* | 8/2022 | Shrivastava | H04W 68/005 |
| 2023/0031588 A1* | 2/2023 | Cheng | H04W 36/033 |
| 2023/0047635 A1* | 2/2023 | Friday | H04L 41/22 |
| 2025/0365771 A1* | 11/2025 | Hooli | H04B 7/0626 |

OTHER PUBLICATIONS

International Search Report and Written Opinion for International Application No. PCT/US2024/026018, mailed Aug. 12, 2024, 14 Pages.
Ortin J., et al., "Modeling the Impact of Start-Up Times on the Performance of Resource-on-Demand Schemes in 802.11 WLANs", 2015 Sustainable Internet and ICT for Sustainability (SUSTAINIT), IFIP, Apr. 14, 2015, 6 Pages, XP032774580, DOI: 10.1109/ SUSTAINIT.2015.7101368 [retrieved on May 4, 2015] p. 1-p. 2.

* cited by examiner

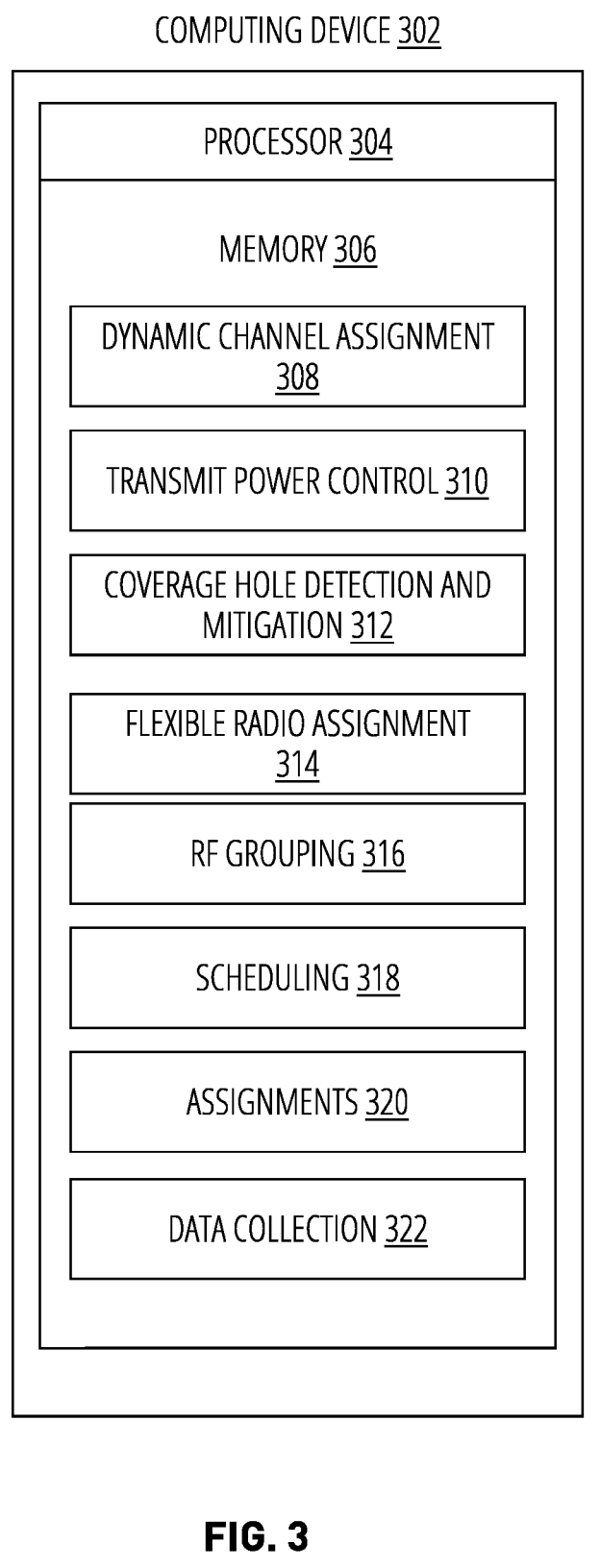

COMPUTING DEVICE 302

PROCESSOR 304

MEMORY 306

DYNAMIC CHANNEL ASSIGNMENT 308

TRANSMIT POWER CONTROL 310

COVERAGE HOLE DETECTION AND MITIGATION 312

FLEXIBLE RADIO ASSIGNMENT 314

RF GROUPING 316

SCHEDULING 318

ASSIGNMENTS 320

DATA COLLECTION 322

FIG. 3

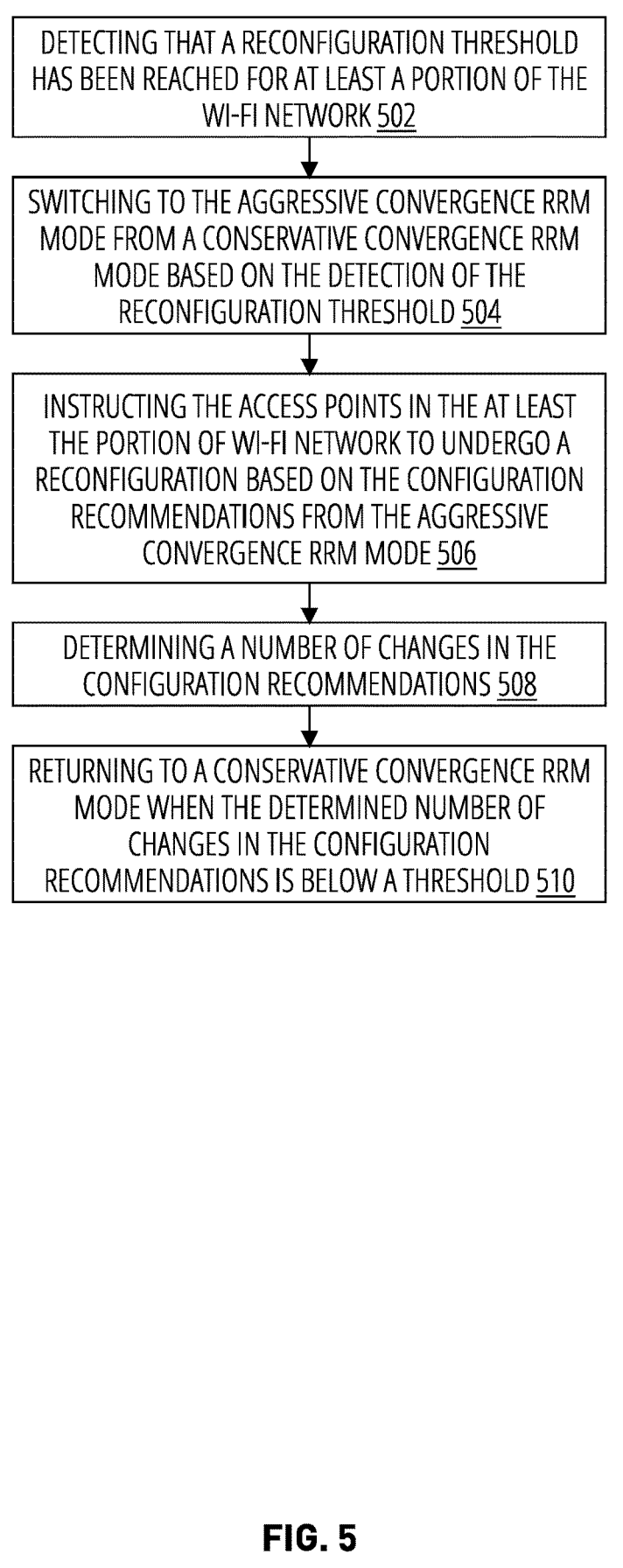

DETECTING THAT A RECONFIGURATION THRESHOLD HAS BEEN REACHED FOR AT LEAST A PORTION OF THE WI-FI NETWORK 502

↓

SWITCHING TO THE AGGRESSIVE CONVERGENCE RRM MODE FROM A CONSERVATIVE CONVERGENCE RRM MODE BASED ON THE DETECTION OF THE RECONFIGURATION THRESHOLD 504

↓

INSTRUCTING THE ACCESS POINTS IN THE AT LEAST THE PORTION OF WI-FI NETWORK TO UNDERGO A RECONFIGURATION BASED ON THE CONFIGURATION RECOMMENDATIONS FROM THE AGGRESSIVE CONVERGENCE RRM MODE 506

↓

DETERMINING A NUMBER OF CHANGES IN THE CONFIGURATION RECOMMENDATIONS 508

↓

RETURNING TO A CONSERVATIVE CONVERGENCE RRM MODE WHEN THE DETERMINED NUMBER OF CHANGES IN THE CONFIGURATION RECOMMENDATIONS IS BELOW A THRESHOLD 510

FIG. 5

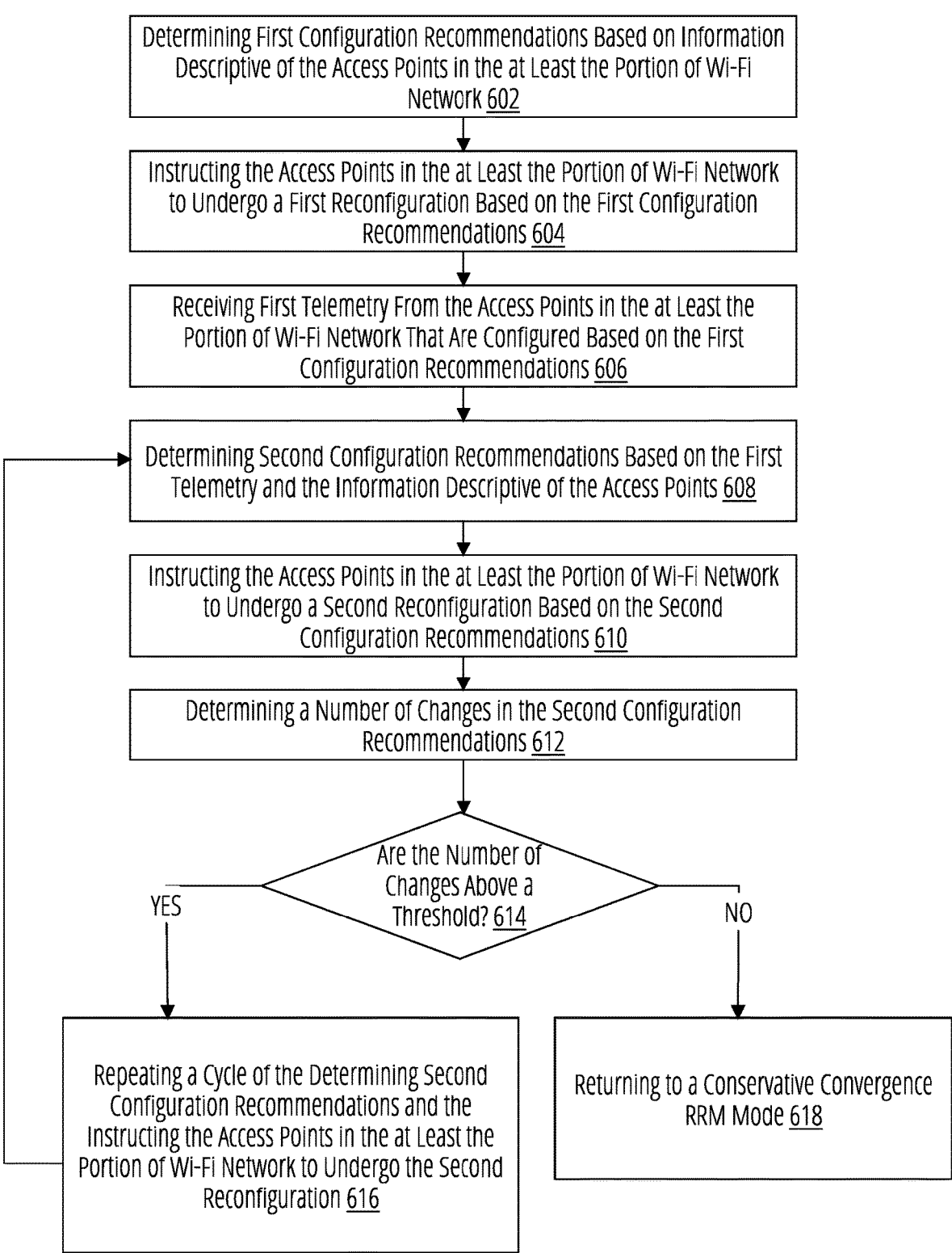

Determining First Configuration Recommendations Based on Information Descriptive of the Access Points in the at Least the Portion of Wi-Fi Network 602

Instructing the Access Points in the at Least the Portion of Wi-Fi Network to Undergo a First Reconfiguration Based on the First Configuration Recommendations 604

Receiving First Telemetry From the Access Points in the at Least the Portion of Wi-Fi Network That Are Configured Based on the First Configuration Recommendations 606

Determining Second Configuration Recommendations Based on the First Telemetry and the Information Descriptive of the Access Points 608

Instructing the Access Points in the at Least the Portion of Wi-Fi Network to Undergo a Second Reconfiguration Based on the Second Configuration Recommendations 610

Determining a Number of Changes in the Second Configuration Recommendations 612

Are the Number of Changes Above a Threshold? 614

YES                                        NO

Repeating a Cycle of the Determining Second Configuration Recommendations and the Instructing the Access Points in the at Least the Portion of Wi-Fi Network to Undergo the Second Reconfiguration 616

Returning to a Conservative Convergence RRM Mode 618

FIG. 6

TRIGGERING RECONFIGURATION OF A WI-FI NETWORK USING RADIO RESOURCE MANAGEMENT(RRM) CONVERGENCE

FIELD OF THE TECHNOLOGY

The subject matter of this disclosure generally relates to the field of computer networks, and more particularly relates to triggering a reconfiguration of a Wi-Fi network using an aggressive convergence radio resource management (RRM) mode in a previously configured Wi-Fi network for automatic RRM tuning.

BACKGROUND

Wireless systems employ processes to manage the radio resources of the wireless devices to optimize parameters including channelization, transmit power, etc. The management of the radio helps avoid or mitigate issues with signal interference, bandwidth contention, etc. Newer Wi-Fi standards allow for more bandwidth capacity for Wireless Local Area Network (WLAN). With wide channel bandwidths, e.g., up to 160 MHZ, and very high data rates, higher throughput through the WLAN can be attained. However, usage of wide bandwidths contributes to high frequency reuse, which can cause more interference on at least some channels, among Basic Service Sets (BSSs) in a Radio Frequency (RF) neighborhood. Thus, the Access Points (APs) providing wireless access to the WLAN carefully administer Radio Resource Management (RRM) to balance the higher bandwidth capacity and the increased interference potential (caused by overlapping spectrum) when selecting the higher bandwidths.

Access Points (APs) may rely on other communications technologies to connect to the rest of the network or Internet. A common connection is an Ethernet switch, which can be directly attached to the AP. Other technologies, such as 5G networks or Data Over Cable Service Interface Specifications (DOCSIS), may also be used for the management of network resources. The actual capability of the RRM to manage resources based on the actual capacity that the AP can provide to its connected stations may be restricted based on constraints of the APs caused by power failures and system restarts.

With current network controller technologies for monitoring network states of a network, a typical network operates in startup mode for a finite duration (e.g., a set number of cycles) to set up the WiFi network, then remains in steady state until the network controller indicates otherwise. Thus, when large interferences in the network occur, it often takes longer to reconfigure the network to counteract those interferences resulting in poor network performance.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates a computing device that performs various RRM operations according to some aspects of the present technology.

FIG. 5 illustrates an example routine for triggering reconfiguration of a wireless network using RRM convergence according to some aspects of the present technology.

FIG. 6 illustrates a process for determining configuration recommendations for reconfiguration of a wireless network according to some aspects of the present technology.

DETAILED DESCRIPTION

Figure 1:
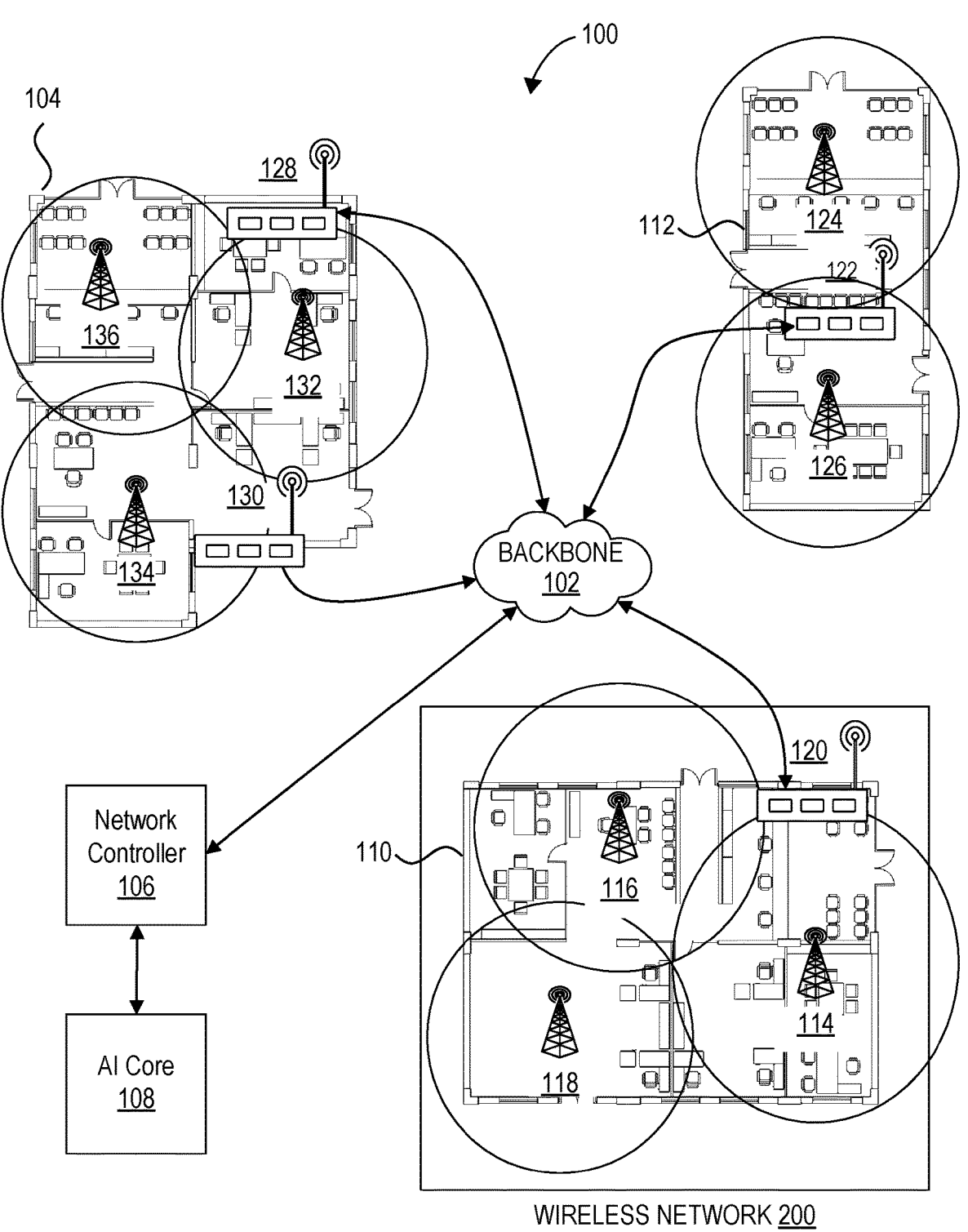
FIG. 1 illustrates an example of a system network, according to some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

When a network is operating in its startup mode, it often utilizes a finite amount of time (e.g., a pre-configured number of cycles) to configure the WiFi network before settling into its steady state. This means that a significant amount of resources and time can be wasted configuring and reconfiguring a network even after a point of diminishing returns has been reached. The present technology can improve this functionality by measuring a number of changes made to the network in each cycle, and once the number of changes to the network configuration is less than a threshold, the network can be considered converged (i.e., configured and ready for regular operations).

Once the network is operating in its steady-state, where the RRM makes a relatively small number of changes to adapt the network to current conditions, these regular changes are only made at pre-defined intervals. This means that the network might experience periods of being poorly configured until a pre-defined interval occurs and maintenance-type RRM changes are made. Large interferences or other conditions in the network can be even more problematic for two reasons. First, the network can be left to operate in a significantly diminished state until the pre-defined interval occurs. This could leave the network or a portion of a network in a condition where it might be nearly unusable or at least significantly impaired. Second, even once an RRM process is trigged the reconfiguration process can take longer than desired, thus resulting in poor performance and client disconnects, because the RRM process would be in a conservative convergence RRM mode where updates are made less frequently. Generally, the conservative convergence RRM mode is desired because it changes network settings infrequently. Since many types of network setting changes will cause client devices to temporarily drop their connections to access points, it is generally desired to make less changes to network configurations. However, when large-scale reconfigurations are needed in a network, such as after a significant interference, power outage, or other condition, the conservative convergence RRM mode can take longer than desired for access points to be sufficiently configured for the network to operate near an acceptable level. The present technology can address this problem by returning the network to aggressive convergence RRM mode (frequently used when a network starts up) where many configuration cycles can be made more quickly in an effort to return the network to a healthy state as quickly as possible.

The present disclosure is directed towards providing self-healing based auto RRM tuning of a network that allows for a transition from conservative convergence RRM mode (maintenance mode) to an aggressive convergence RRM mode (startup mode) depending on the health score of the network. The present technology provides a mechanism to switch between conservative convergence RRM mode and aggressive convergence RRM modes based on the monitoring of a health score, which is a way of monitoring and tracking the overall network health and performance.

In one aspect, a method for triggering a reconfiguration of a Wi-Fi network using an aggressive convergence RRM mode in a previously configured Wi-Fi network is disclosed. The method includes detecting that a reconfiguration threshold has been reached for at least a portion of the Wi-Fi network, the reconfiguration threshold indicating that configurations of a significant number of access points in the portion of Wi-Fi network could be improved. The method includes switching to the aggressive convergence RRM mode from a conservative convergence RRM mode based on the detection of the reconfiguration threshold.

In another aspect, the aggressive convergence RRM mode is characterized by a relatively low hysteresis parameter, wherein the conservative convergence RRM mode is characterized by a relatively high hysteresis parameter, the hysteresis parameter functions to discourage updates to access point reconfigurations such that when the hysteresis parameter is relatively high, less reconfigurations are made to the access points.

In another aspect, the reconfiguration threshold is based on an aggregate health score for the access points in the portion of Wi-Fi network, the reconfiguration threshold being a percentage reduction in the aggregate health score for the access points in the portion of Wi-Fi network.

In another aspect, the reconfiguration threshold is based on an increase in a number of channel changes or power level changes by the access points in the portion of Wi-Fi network, the reconfiguration threshold being a percentage increase in the number of the channel changes, or the power level changes.

In another aspect, the aggressive convergence RRM mode comprises determining first configuration recommendations based on information descriptive of the access points in the portion of Wi-Fi network. The aggressive convergence RRM mode comprises instructing the access points in the portion of Wi-Fi network to undergo a first reconfiguration based on the first configuration recommendations. The aggressive convergence RRM mode comprises receiving first telemetry from the access points in the portion of Wi-Fi network that are configured based on the first configuration recommendations. The aggressive convergence RRM mode comprises determining second configuration recommendations based on the first telemetry and the information descriptive of the access points. The aggressive convergence RRM mode comprises instructing the access points in the portion of Wi-Fi network to undergo a second reconfiguration based on the second configuration recommendations. The aggressive convergence RRM mode comprises determining a number of changes in the second configuration recommendations.

In another aspect, the method further comprises repeating a cycle of the determining second configuration recommendations and the instructing the access points in the portion of Wi-Fi network to undergo the second reconfiguration, when the determined number of changes in the second configuration recommendations is above a threshold.

In another aspect, the method further comprises returning to a conservative convergence RRM mode when the determined number of changes in the second configuration recommendations is below a threshold.

In another aspect, the number of changes in the second configuration recommendations is a number of channel changes, channel width changes, or transmission power changes.

In one aspect, a network device includes one or more memories having computer-readable instructions stored therein, and one or more processors. The one or more processors are configured to execute the computer-readable instructions to detect that a reconfiguration threshold has been reached for at least a portion of the Wi-Fi network, the reconfiguration threshold indicating that configurations of a significant number of access points in the portion of Wi-Fi network could be improved, and switch to the aggressive convergence RRM mode from a conservative convergence RRM mode based on the detection of the reconfiguration threshold.

In one aspect, one or more non-transitory computer-readable media include computer-readable instructions, which when executed by one or more processors of a network appliance, cause the network appliance to detect that a reconfiguration threshold has been reached for at least a portion of the Wi-Fi network, the reconfiguration threshold indicating that configurations of a significant number of access points in the portion of Wi-Fi network could be improved, and switch to the aggressive convergence RRM mode from a conservative convergence RRM mode based on the detection of the reconfiguration threshold.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

Some wireless communications systems (for example, Wi-Fi or WLAN systems) may support allocating multiple resource units (RUs) over a channel bandwidth. For example, an access point (AP) may allocate each of multiple RUs to one or more respective stations (STAs). For example, the AP may transmit a downlink (DL) OFDMA communication that includes multiple RUs each addressed to a respective STA. Similarly, the AP may transmit scheduling information to multiple STAs that indicates an RU allocation. The RU allocation may indicate which RU each of the STAs is to use to transmit an uplink (UL) OFDMA communication to the AP. Each of the RUs includes a fixed number of tones or subcarriers. Some of the tones (a majority of the tones in some cases) are used to carry data symbols, and some of the tones ("pilot tones") are used to carry pilot symbols. Pilot signals may be transmitted with the data to improve reception and reliability of the data.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The implementation of automated RRM (Auto RRM) systems is directed towards allowing access points to dynamically plan WLAN channels and radio transmit (TX) power. Auto RRM is made up of two major components including auto channel and auto TX power that provide an initial channel plan, and then adjust dynamically over time based on the environment. The auto TX power periodically identifies neighbor APs collected from each AP in the network. During the identification, neighbor AP information is collected that contains the Signal-to-Noise Ratio (SNR) for all neighboring APs in the same wireless network, and all connected client devices in communication with the respective APs. The Auto RRM system continuously monitors the TX power of the APs and calculates an ideal TX power for each AP in the network.

The auto channel is designed to react to degrading conditions while balancing client performance against the disruptiveness of changing channels. The goal of auto channel is to build a channel plan that minimizes channel overlap, optimizes cell sizes for better roaming, and maximizes channel efficiency by picking the best channel available for each AP. Then, it regularly rebuilds the plan in search of an optimization. Determining the best channel for each of the APs is based on the APs' reporting of their logging data including key performance indicators (KPIs) to algorithmically provide configuration recommendations. The KPIs can include node performance of how well an access point should perform on a given channel. The KPIs can include network performance of a network appliance within the network. The KPIs can include channel quality intended to measure interference, duty cycle, channel width, and AP load. The KPIs can also include the hop limit to determine how many neighboring APs will be considered when planning an AP's channel. The hop limit can determine the "aggressiveness" during various time intervals with different hop limits.

The current technology offers a solution to the need for monitoring the Radio Resource Management (RRM) performance of each Access Point (AP) in a network, and automatically initiating a recalibration of APs based on how that network is performing. The proposed techniques and methods described in this disclosure detail the initiation of aggressive convergence RRM modes upon being triggered based on KPIs, allowing for improved performance.

Figure 2:
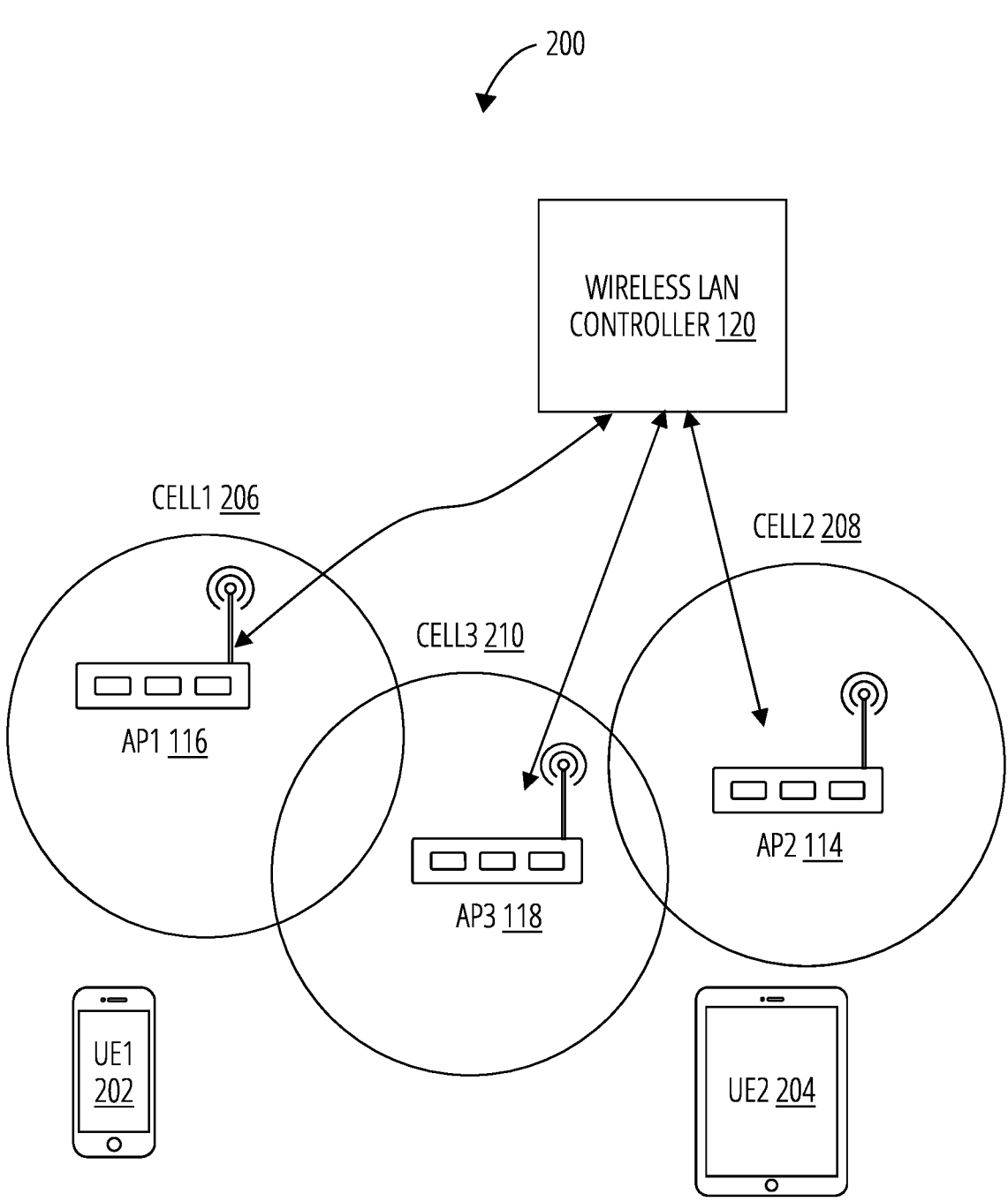
FIG. 2 illustrates an example wireless network according to some aspects of the present technology.

Prior to describing the proposed techniques and methods, example network environments and architectures for the triggering of RRM compute requests, as illustrated in FIG. 1, FIG. 2 and FIG. 3 are described first.

FIG. 1 illustrates an example of a system network 100 that includes three buildings (i.e., building A 104, building B 110, and building C 112). In this non-limiting example, building A 104 includes two wireless local area network (LAN) controllers (WLCs) and three access points (APs). Here, a first RF Group is formed among the wireless LAN controller WLC A1 128 and access points AP A1 132 and AP A3 136. A second RF Group is formed by WLC A2 130 and access points AP A2 134. Building B 110 includes a single RF group: wireless LAN controller WLC B 122 and access points AP B1 124 and AP B2 126. Finally, building C 112 includes wireless network 200, which has a single RF group, which is made up of one wireless LAN controller (i.e., WLC 120) and three access points (AP1 116, AP2 114, and AP3 118). The WLCs can be, e.g., a CISCO WLC such as WLC model numbers 9800, 8500, 7500, 5520, 5760, 5508, 3850, and 2500. The WLCs can transmit and receive signals to and from the backbone 102. For example, communications between the backbone 102 and the WLCs can be performed via control and provisioning of wireless access points (CAP-WAP) protocol.

The settings of the WLCs can be controlled by a network controller 106, which communicates with the WLCs via the backbone 102. For example, the network controller 106 can be a CISCO Digital Network Architecture (DNA) center, which is a centralized intent-based network management system. The network controller 106 can be based in the cloud, for example. Further, an artificial intelligence (AI) core 108 communicates signals to and from the network controller 106. The A.I. core 108 can, e.g., signal configuration recommendations, and then some or all of the configuration recommendations can be implemented by the network controller 106, which signals network settings and configurations to the WLCs. The WLCs then apply the configurations and settings to the APs.

For example, the network controller 106 can receive signals from each WLC. Each of the signals received can be monitored and monitor the signals received for telemetry and wireless frequency restrictions that may be caused by the configurations of the APs. The signals received can be affected by the structure of each of the three buildings (i.e., building A 104, building B 110, and building C 112). Although each building may have various AP configurations or structural elements that make up the WLCs of each of building A 104, building B 110, and building C 112. Each portion of building A 104, building B 110, and building C 112 may have a plurality of APs positioned through a floorplan of each of the buildings, each of which may have one or more communications with neighbor APs that may affect the overall performance of the network. The effect of data traffic transmitted between each of the APs can be monitored based on the telemetry data collected on the wireless network 200.

For example, the A.I. core 108 can receive information such as telemetry data collected on the wireless network 200 by the network controller 106. The A.I. core 108 processes the received information to generate configuration recommendations for the wireless network 200. The configuration recommendations can further be generated based on interference, interrupts, and KPIs exceeding a reconfiguration threshold. The A.I. core 108 can analyze the telemetry data collected on the wireless network 200 and identify that a significant event has occurred that has resulted in an indication from the network controller 106 that one or more of the APs have experienced a change in frequency, utilization, interference, or transmit power. The network controller 106 can identify a number of APs impacted, a cause of the impact, and corrective action needed to optimize the APs to remedy the impact experienced by the significant event. Upon a corrective action being determined, the A.I. core 108 can generate configuration recommendations. The configuration recommendations are transmitted by the A.I. core 108 to the network controller 106 for management of the APs managed.

The configuration recommendations can be provided based on structural changes in the buildings, or an overload of data traffic in any portion of the APs for each of the WLCs. The received information may include information related to transmission, reception, interference, exceptions, mitigation events, and so forth. In some aspects, the APs may also collect telemetry information from each other and may communicate using a neighbor discovery protocol (NDP). The A.I. core 108 may be, for example, a cloud-based application that learns from the wireless network 200 and from additional wireless networks how best to optimize the network configurations based on data and measured values from the respective networks. The configuration recommendations are then sent from the A.I. core 108 to the network controller 106. The recommendations received can trigger the initiation of RRM operations to improve the overall network performance of one or more of the WLCs monitored by the network controller 106.

In some examples, each of building A 104, building B 110, and building C 112 represent multiple portions of the same building, as multiple floors, or as a part of the same geographical region. The network controller 106 can monitor, via the backbone 102, each of the buildings to determine how to most efficiently provide network resources to handle data traffic as it affects each building during various time periods or upon experiencing qualifying events.

The wireless network 200 includes an artificial intelligence (AI) Core 102, a network controller 104, a wireless local area network (LAN) Controller 106, and several access points (APs) (e.g., AP1 116, AP2 114, and AP3 118). Each AP has a surrounding cell in which user devices, such as user equipment 1 (UE1) 202 and user equipment 2 (UE2) 204 can wirelessly communicate with the respective AP of the cell (e.g., cell1 206 surrounds AP1 116; cell2 208 surrounds AP2 114; cell3 210 surrounds AP3 118). As the user device moves from one cell to the next, the user device will change which cell it is communicating with. The wireless network 200 provides wireless communications with one or more wireless devices such as user devices.

A network administrator can interact with the network controller 106 using a graphical user interface (GUI) that enables the network administrator to specify various settings, including, e.g., settings for when to apply configuration recommendations and which of the configuration recommendations to apply at which times and to which parts of the wireless network 200. Then the configuration recommendations can be implemented by the network controller 106 in accordance with the specifications by the network administrator (or other uses).

The wireless LAN controller 120 can communicate with a wide area network (WAN) to allow the user devices to access the internet, for example. The wireless LAN controller 120 can give the network administrator the ability to monitor and trace all the data traffic between the APs, and the information associated with the performance of the network, including key performance indicators (KPIs). Based on the KPIs and the monitored data traffic, the wireless LAN controller 120 can dynamically adjust the configurations of the APs to meet network demands based on increased data traffic during various time periods and the management of devices that are allowed to connect to the network. The wireless network 200 can be a WiFi network operating in accordance with an IEEE 802.11 protocol.

The A.I. core 108 can be used to perform radio resource management (RRM). RRM allows the wireless network 200 to continuously analyze the existing RF environment and automatically adjust each APs' power and channel configurations to help mitigate interference (e.g., adjacent channel interference, co-channel interference, electromagnetic interference, etc.) and signal coverage problems. RRM can reduce the need to perform exhaustive site surveys, and RRM can increase system capacity, and provides automated self-healing functionality to compensate for RF dead zones and AP failures. The RRM, in furtherance of performing RRM operations, can also perform radio resource monitoring, power control transmission, dynamic channel assignment, coverage hole detection and correction, and RF grouping.

In some examples, the RRM can be remotely communicative with the A.I. core 108 or embedded into one or more network appliances of the wireless network 200 and provide real-time RF management of the wireless network 200. Real-time RF management can be based on the monitoring of interference, noise levels, the received signal strength (RSSI), and signal-to-noise ratio (SNR) for all connected clients and the traffic load of the network, including the total bandwidth used for transmitting and receiving traffic for AP1 116, and AP2 114, as it relates to each of the UE1 202 and UE2 204.

RRM includes several algorithms, which together provide management of the wireless network 200 and resources of the wireless network 200. FIG. 3 illustrates a computing device 302 that performs various RRM steps/methods capable of performing algorithms for radio resource management of a network. Computing device 302 can be performed using distributed computing. Some or all of the functions of computing device 302 can be performed by the WLCs and some or all of the functions may be performed by the network controller 106 and/or the A.I. core 108. In some examples, the computing device 302 can be an embodiment of the A.I. core 108, illustrated in FIG. 2. In some embodiments, the functions attributed to computing device 302 may reside across the A.I. core 108, the network controller 106, and other devices illustrated in wireless network 200. The computing device 302 includes a processor 304 that performs the steps of the respective methods when executing the respective methods stored in memory 306. The methods stored in the memory 306 can include, for example: (i) RF Grouping 316 (e.g., an algorithm responsible for determining the RF Group Leader and members); (ii) Flexible Radio Assignment (FRA) 314 (e.g., an algorithm charged with identifying redundant radios resources and re-assigning the resource to a better role); (iii) Dynamic Channel Assignment (DCA) 308 (e.g., a global algorithm that runs on the RF Group leader); (iv) Transmit Power Control (TPC) 310 (e.g., a global algorithm that runs on the RF Group Leader; and (v) Coverage Hole Detection and Mitigation (CHDM) 312 (e.g., a local algorithm that runs on each individual controller). The respective methods help to maintain optimal performance by optimally applying resources to balance various countervailing interests.

For example, increasing the transmit power in a cell (e.g., cell1 206 of an AP1 116) may help to overcome noise from the environment, but too much of an increase in the transmit power could cause interference with neighboring cells (e.g., cell3 210 of AP3 118), especially in regions where two or more cells overlap. If two cells overlap one another and the cells are on the same channel, then they share the spectrum, resulting in diminished communication capacity. Not only are users of each cell sharing the single channel of the available spectrum, but the management traffic also increases, which also takes up a part of the channel capacity. The result is higher consumption of airtime and less throughput. This is commonly known as co-channel interference. Assuming all wireless devices are operating on the same network, two aspects of the wireless network 200 can be controlled to mitigate co-channel interference. For example, to adjust any given cell in response to co-channel interference, the wireless network 200 can adjust the channel plan to facilitate the maximum separation of one AP from another AP on the same channel, and the wireless network 200 can adjust power levels to increase or decrease the size of the effective cells corresponding to respective APs. If more than two channels are available, neighboring cells can operate on different channels, avoiding interference in overlapping regions between cells.

The use of RRM has several advantages, including features that manage specific traffic types or client types, which can greatly increase spectral efficiency and assist RRM in providing a better user experience. RRM can further provide advantages including improved quality of service, increased resilience and reliability, better utilization of resources, reduced maintenance costs, enhanced spectrum efficiency, and faster response times to changes in the environment. RRM can be used to reconfigure networks dynamically so that they are able to adjust quickly when something unexpected occurs without needing manual intervention. This ensures that the network is running optimally and maximizes efficiency. Additionally, RRM allows for more precise control over the wireless environment, leading to better user experience and improved overall performance.

The RF grouping 316 method is used as the basis for the administrative management domain and the physical management domain within the RF Network. Regarding the administrative domain, proper function of the RRM is based on knowing which APs and controllers are under administrative control for each part of the network. For example, the RF Group name can be an identifier that all controllers and APs within the group will share. Regarding the physical RF domain, the RRM calculates channel plans and power settings based on an awareness of the RF Location of the APs within the network. For example, neighbor messaging can use the RF Group Name in a special broadcast message that allows the APs in the RF group to identify one another and to measure their RF Proximity. This information can then be used to form RF Neighborhoods within the RF Group (e.g., a group of AP's that belong to the same RF Group that can physically hear one another's neighbor messages above-80 dBm, for example). Each RF Group has at least one RF Group Leader per frequency band (e.g., 2.4 gigahertz (GHz), 5 GHZ, 6 GHZ). The RF Group Leader can be the physical device responsible for: (i) configuration; (ii) running the active algorithms; and (iii) collecting and storing RF-group data and metrics.

In certain non-limiting examples, the Neighbor Discovery Protocol (NDP) is performed by sending an NDP packet from every AP/Radio/Channel on an interval (e.g., every 60 seconds or less). The NDP packet is a broadcast message that APs listen for and allows the AP to understand how every radio on every channel hears every other radio. The NDP packet also provides the actual RF path loss between APs. When an AP receives an NDP message, the AP validates whether the message is from a member of its RF Group. If the NDP message is valid, the AP forwards the message along with the received channel and RSSI to the controller. The forwarded message is added to the neighbor database, which in turn is forwarded to the RF group leader periodically. For each AP, each radio can store up to a predefined number of neighbors ordered by RSSI high to low. Post-processing of the RSSI information can be used to generate measurements for receiving (RX) Neighbors (e.g., how the given AP hears other APs) and TX Neighbors (e.g., how other APs hear the given AP).

The FRA 314 uses the NDP messages to locate each radio based on RF distance and evaluate overlapping coverage by cell. Now, the flexible radio assignment 314 method is described according to certain non-limiting examples. First, using the NDP measurements from the AP's, FRA plots the x and y coordinates relative to every other AP contained in the solution set (AP Group, physical neighbors). The circumference of each cell is calculated based on the present TX power level of each AP. This produces a logical matrix of the AP's coverage intersections. Based on this understanding. FRA uses a multipoint analysis, to determine the percentage of overlapping coverage for each evaluated AP. The output of this calculation is the COF (Coverage Overlap Factor %). Coverage Overlap Factor is the percentage of the analyzed cell that is covered at −67 dBm or higher by other radios in service. In the process of calculating this coverage, the FRA method 314 keeps track of radios that are coverage contributors to other radios COF, and the FRA method 314 prevents those radios to be marked redundant as long as a radio they are a contributor for is marked redundant.

Once a Radio is marked redundant, the next step depends on the radio configuration. For example, there can be two (or more) operational states to which the flexible radio can be assigned: (i) FRA-auto or (ii) manual. When the radios in the "FRA Auto" state, FRA looks to DCA to decide what to do with the now redundant radio(s). DCA's priorities are, first, to try to assign the redundant radio in 5 GHZ and increase capacity, but, if the DCA determines that there is already maximum 5 GHz coverage, the radio will be assigned to a monitor role instead.

Regarding the dynamic channel assignments 308 method, the DCA monitors the available channels for the RF group and tracks the changing conditions. The DCA then optimize the RF separation between AP's (minimizing co-channel interference) by selecting channels that are physically diverse, which maximizes RF efficiency. According to certain non-limiting examples, the DCA can monitor all available channels and develops the Cost Metric (CM) that will be used to evaluate various channel plan options. The CM can be an RSSI value comprised of interference, noise, a constant (user sensitivity threshold), and load (if enabled). The Cost Metric equates to a weighted Signal to Noise Interference Ratio (SNIR) Signal to Noise Interference Ratio. The Group Leader can maintain the neighbor lists for all APs in the RF Group and organizes these neighbors into RF Neighborhoods. The DCA can use the following metrics, which can be tracked for each AP in the RF Group: (i) same channel contention (e.g., other AP's/clients on the same channel—also known as Co-Channel interference or CCI); (ii) foreign channel-rogue (e.g., other non RF Group AP's operating on or overlapping with the AP's served channel); (iii) noise (e.g., sources of interference such as Bluetooth, analog video, or cordless phones); (iv) channel load (e.g., through the use of industry standard QBSS measurements—these metrics are gathered from the Physical layer-very similar to CAC load measurements); and (v) DCA sensitivity (e.g., a sensitivity threshold selectable by the user that applies hysteresis to the evaluation on channel changes). The impact of each of these factors can be combined to form a single RSSI based metric known as the Cost Metric (CM). The CM then represents complex SNIR of a specific channel, which is used to evaluate the throughput potential of one channel over another. The goal is to be able to select the best channel for a given AP/Radio that minimizes interference.

The transmit power control 210 method balances the competing objectives of increasing SNR for the current AP while avoiding co-channel interference with neighboring APs. Since one of the major sources of interference in the network is the signals from other/neighboring APs, the transmit power control 210 method is important for optimal performance. That is, DCA and TPC work hand in hand to manage the RF environment. Transmit power largely determines our cell boundaries. The goal is to maximize the RF coverage in the environment without causing co-channel interference.

According to certain non-limiting examples, TPC uses the TX neighbor and RF Neighbor lists generated by the NDP method. RSSI organized lists built on how reception strength (Rx) from other APs (RX Neighbor) and transmit strength (Tx) to other APs (TX Neighbor), to form a picture of the communication strength among the respective APs within the RF Neighborhood and RF Group. Based on this information TPC sets the transmit power of each AP to maximize the coverage and minimize co-channel interference. TPC will adjust the Tx power up or down to meet the coverage level indicated by the TPC Threshold. TPC runs on the RF Group leader and is a global algorithm that can be sub configured in RF profiles for groups of APs in an AP group.

According to examples of the disclosure, the CHDM 312 can be used to achieve the following objectives: (i) detect coverage holes, (ii) validate the coverage holes, and (iii) mitigate the coverage holes. That is, CHDM 312 first detects and mitigates coverage holes (if possible, without creating other problems) by increasing the transmit power and therefore cell area. According to certain non-limiting examples, CHDM can be a local algorithm that runs independent of RRM and the RF Group leader. To facilitate making decisions at a local level, CHDM can run on every controller. That is, each individual controller performs coverage hole detection monitoring all associated AP's and thus monitoring every attached client and their received signal levels. Mitigation involves increasing the power on an AP, or group of APs to improve coverage levels to a certain area where client signals fall below a customer selectable threshold.

According to certain non-limiting examples, coverage hole detection can be based on a 5 second coverage hold detection (CHD) measurement period histogram of each client RSSI values maintained by the AP. Values between −90 dBm and −60 dBm are collected in a histogram in 1 dB increments. A client falling below the configured RSSI thresholds for 5 seconds can be marked, e.g., as a pre-coverage hole event.

According to certain non-limiting examples, coverage hole mitigation is a process performed once the decision to mitigate is made. If a coverage hole exists and it meets certain criteria for mitigation (e.g., a minimum number of clients and a minimum percentage), the AP will increase power by one step. CHDM will then continue to run, and if additional mitigation is called for will re-qualify and power will again be increased by 1 step. This incremental approach can prevent wild and unstable swings in power.

Coverage hole mitigation, while operating independent of DCA and TPC, can have a significant effect on surrounding AP's and the balance of the RF in an environment. Part of the decision to mitigate is based on an evaluation of whether the mitigation could be successful. Increasing the power of a given AP independently of the RF Group metrics is likely to negatively impacting surrounding AP's. So, mitigation can be applied judiciously. The combination of the new detection metrics and the power limits included in mitigation are applied to make CHDM a stable algorithm.

In addition to the above methods, the memory 306 of the computing device 302 can also store information for scheduling 318, assignments 320, and information for data collection 322. The data collection 322 can include several types of measurements.

With respect to data collection 322, the RRM processes collected data, which is then used in the organization of RRM as well as for processing channel and power selections for the connected APs. Now, a discussion is provided for how and where to configure monitoring tasks, and how the collected data relates to an operational environment.

Channel scanning, such as passive channel scanning, can be performed on all channels supported by the selected radio. Additionally, or alternatively, channel scanning can be performed on a set of channels (i.e., the channel set) defined by the DCA method, which can include all of the non-overlapping channels. The channel set can be modified in accordance with user inputs, for example. Additionally, a passive dwell lasting a predefined duration (e.g., 50 msec.) can be used to detect rogue devices, and collect noise and interference metrics. Also, a Neighbor Discovery Protocol Transmission (TX) can be used to send the NDP message from all channels defined to be part of a monitor set.

Figure 4A:
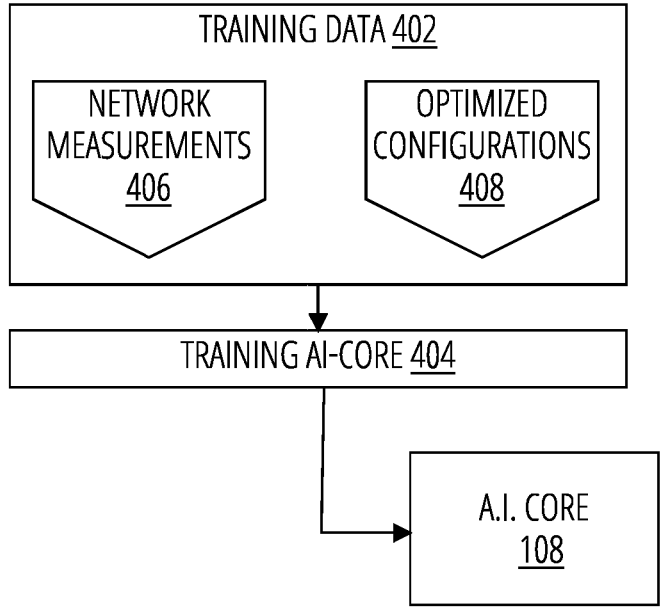
FIG. 4A illustrates an example of training the artificial intelligence (A.I.) Core according to some aspects of the present technology.

FIG. 4A illustrates an example of training the A.I. core 108. In block 404, training data 402 is applied to training the A.I. core 108. For example, the A.I. core 108 can be an artificial neural network (ANN) that is trained via supervised learning using a backpropagation technique to train the weighting parameters between nodes within respective layers of the ANN. Training data 402 is obtained in training AI-core 404, supervised learning is obtained, and the network is iteratively updated to reduce an error/loss function. The value of the error/loss function decreases as the A.I. core 108 outputs configurations that increasingly approximate the optimized configurations 408. In other words, ANN infers the mapping implied by the training data, and the error/loss function produces an error value related to the mismatch between the optimized configurations 408 and the output from the A.I. core 108 that is produced by applying the network measurements 406 to the A.I. core 108. For example, in certain implementations, the cost function can use the mean-squared error to minimize the average squared error. In the case of a multilayer perceptron (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of the numerous algorithms for training neural network models (e.g., by applying optimization theory and statistical estimation).

For example, the optimization method used in training artificial neural networks can use some form of gradient descent, using backpropagation to compute the actual gradients. The optimization is performed by taking the derivative of the cost function with respect to the network parameters and then changing those parameters in a gradient-related direction. Non-limiting examples of backpropagation training algorithms include: a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribićre update, Powell-Beale restart, and scaled conjugate gradient). Additionally, evolutionary methods, such as gene expression programming, simulated annealing, expectation-maximization, nonparametric methods and particle swarm optimization, can also be used for training the A.I. core 108.

The training 404 of the A.I. core 108 can also include various techniques to prevent overfitting to the training data 402 and for validating the trained A.I. core 108. For example, boot strapping and random sampling of the training data 402 can be used during training.

In addition to supervised learning used to initially train the A.I. core 108, the A.I. core 108 can be continuously trained by using reinforcement learning based on the network measurements and the corresponding configurations used on the network. The A.I. core 108 can be cloud-based and can be trained using network measurements and the corresponding configurations from other networks that provide feedback to the cloud.

Further, other machine learning (ML) algorithms can be used for the A.I. core 108, and the A.I. core 108 is not limited to being an ANN. For example, there are many machine-learning models, and the A.I. core 108 can be based on machine learning systems that include generative adversarial networks (GANs) that are trained, for example, using pairs of network measurements and their corresponding optimized configurations.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, GANs, support vector machines, image registration methods, and/or applicable rule-based systems. Where regression algorithms are used, they can include but are not limited to a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 4B:
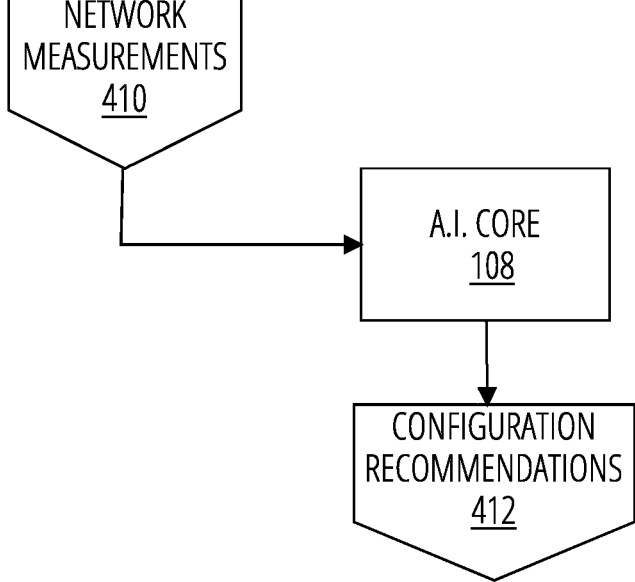
FIG. 4B illustrates an example process for of using the trained A.I. Core according to some aspects of the present technology.

FIG. 4B illustrates an example of using the trained A.I. core 108. The actual network measurements are applied to the trained A.I. core 108, which then generated configuration recommendations 412. The configuration recommendations will then be provided to a network controller 106, which selectively applies the configuration recommendations in accordance with settings therein. For example, the configuration recommendations can be applied a predefined times for certain portions of the wireless network 200. For example, certain configuration recommendations may be applied when there is a radio reset. Other configuration recommendations be applied when there is minimal risk of disrupting service during business hours. Further, different regions within the wireless network 200 might be scheduled differently.

The actual network measurements are applied to the trained A.I. core 108, which then generated configuration recommendations 412. The configuration recommendations will then be provided to a network controller 106, which selectively applies the configuration recommendations in accordance with the settings therein. For example, the configuration recommendations can be applied a predefined times for certain portions of the wireless network 200. For example, certain configuration recommendations may be applied when there is a radio reset. Other configuration recommendations be applied when there is minimal risk of disrupting service during business hours. Further, different regions within the wireless network 200 might be scheduled differently.

In some examples, the configuration recommendations can be provided to access points managed by a network controller upon a restart of the network or upon entering a startup mode. For example, in startup mode, at startup time, the controller can tell the APs the best configurations to enhance the cell size and performance of the AP including the power, the frequencies, and the channels to transmit on.

FIG. 5 illustrates an example routine for triggering the reconfiguration of a wireless network using an aggressive convergence RRM mode according to some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at the same time or in a specific sequence.

As addressed herein, the present technology addresses problems in the art regarding the amount of time to reach a sufficiently configured state (RRM convergence) when operating in an aggressive convergence RRM mode, and to reenter the aggressive convergence RRM mode from a conservative convergence RRM mode when network performance is significantly degraded.

The present disclosure is directed towards providing self-healing-based auto RRM tuning of a network that allows for a transition from a maintenance (conservative) mode to a startup (aggressive) mode depending on the health score of the network. The present technology provides a mechanism to switch between conservative convergence RRM mode and aggressive convergence RRM modes based on the monitoring of a health score, which is a way of monitoring and tracking the overall network health and performance.

According to some examples, the method includes detecting that a reconfiguration threshold has been reached for at least a portion of the Wi-Fi network at block 502. For example, the A.I. core 108 illustrated in FIG. 1 may detect that a reconfiguration threshold has been reached for at least a portion of the Wi-Fi network. The reconfiguration threshold indicating that configurations of a significant number of access points in at least a portion of Wi-Fi network could be improved. For example, there could be persistent interference in a portion of the network, or there could be a power outage, updates to the access points, or any other issue to cause a significant portion of access points in a portion of the network to be operating with unsatisfactory KPIs.

According to some examples, the method includes switching to the aggressive convergence RRM mode from a conservative convergence RRM mode based on the detection of the reconfiguration threshold at block 504. For example, the A.I. core 108 illustrated in FIG. 1 may switch to the aggressive convergence RRM mode from a conservative convergence RRM mode based on the detection of the reconfiguration threshold. In some examples, a recalibration of the APs can be triggered based on the detection of the reconfiguration threshold being met. Accordingly, the recalibration can be caused by a sensitivity score of the network. The sensitivity score controls a tolerance level for changes to one or more access points in the network.

In some examples, when convergence is encountered in a WLAN and the APs are configured to reach an optimal configuration and reach peak performance, a variety of RRM operations can be initiated to make adjustments to the APs for optimization. In some examples, these RRM operations can include adjusting the power, antenna direction, and channel selection of each Access Point in order to ensure maximum coverage and minimal interference. By allowing the network to quickly adjust itself after experiencing any changes, the network is able to provide improved performance for its users and ensure that data is transferred in a reliable manner. Furthermore, convergence also helps to reduce power consumption and increase efficiency in wireless networks.

The WLAN RRM supports two modes of optimization, aggressive convergence RRM mode, and a conservative convergence RRM mode. The aggressive convergence RRM mode can be implemented in order to perform a quick convergence that uses more updates in a minimal amount of time. The conservative convergence RRM mode can be implemented to perform a post-convergence RRM operation that introduces less updates to the network than during an aggressive convergence RRM mode. The updates made during the conservative convergence RRM mode can be considered refinements to local areas of the network.

The aggressive convergence RRM mode is characterized by a relatively low hysteresis parameter. The conservative convergence RRM mode is characterized by a relatively high hysteresis parameter. The hysteresis parameter functions to discourage updates to access point reconfigurations such that when the hysteresis parameter is relatively high, less reconfigurations are made to the access points. The reconfiguration threshold is based on an aggregate health score for the access points in the portion of Wi-Fi network. In some examples, the reconfiguration threshold is a percentage reduction in the aggregate health score for the access points in the portion of Wi-Fi network. In some examples, the reconfiguration threshold is based on an increase in a number of channel changes or power level changes by the access points in the portion of Wi-Fi network. In some examples, the reconfiguration threshold is caused by power failure, a system restart, a change in network configuration, or one or more anomalies.

According to some examples, the method includes instructing the access points in the portion of Wi-Fi network to undergo a reconfiguration based on the configuration recommendations from the aggressive convergence RRM mode at block 506. For example, the network controller can receive configuration recommendations from the A.I. core 108, based on the configuration recommendations recommended by the A.I. core 108. Accordingly, access points AP B1 124, and AP B2 126 can receive the configuration recommendations from the network controller 106 for aggressive convergence RRM mode.

According to some examples, the method includes determining a number of changes in the configuration recommendations at block 508. The number of changes in the second configuration recommendations is a number of channel changes, channel width changes, or transmission power changes. For example, the network controller 106 can determine from the configuration recommendations received from the A.I. core 108, the number of changes to the configuration recommendations to be transmitted to the AP1 116, AP2 114, and AP3 118.

According to some examples, the method includes returning to a conservative convergence RRM mode when the determined number of changes in the configuration recommendations is below a threshold at block 510. For example, the network controller 106 can determine based on the number of configuration recommendations received from the A.I. core 108, that the number of changes is below a threshold.

FIG. 6 illustrates a process for determining configuration recommendations for reconfiguration of a wireless network according to some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at the same time or in a specific sequence.

In some embodiments, the blocks described in FIG. 6 provide more detail to the operations discussed with respect to block 506, block 508, and block 510.

According to some examples, the method includes determining first configuration recommendations based on information descriptive of the access points in the portion of Wi-Fi network at block 602. For example, the A.I. core 108 may determine first configuration recommendations of the access points in the portion of the Wi-Fi network.

According to some examples, the method includes instructing the access points in the portion of Wi-Fi network to undergo a first reconfiguration based on the first configuration recommendations at block 604. For example, the A.I. core 108 illustrated in FIG. 1 may instruct the access points in the portion of Wi-Fi network, to undergo a first reconfiguration based on the first configuration recommendations received from the A.I. core 108.

According to some examples, the method includes receiving first telemetry from the access points in the portion of Wi-Fi network that are configured based on the first configuration recommendations at block 606. For example, the A.I. core 108 illustrated in FIG. 1 may receive first telemetry from network controllers 106 in at least one portion of the Wi-Fi network that are configured based on the first configuration recommendations generated by the A.I. core 108.

According to some examples, the method includes determining second configuration recommendations based on the first telemetry and the information descriptive of the access points at block 608. For example, the A.I. core 108 illustrated in FIG. 1 may determine second configuration recommendations based on the first telemetry and the information descriptive of the access points. The A.I. core 108 can generate the second configuration recommendations based on the first telemetry and the information descriptive of the access points transmitted from the network controllers 106.

According to some examples, the method includes instructing the access points in the portion of Wi-Fi network to undergo a second reconfiguration based on the second configuration recommendations at block 610. For example, the A.I. core 108 illustrated in FIG. 1 may instruct the access points in the portion of Wi-Fi network to undergo a second reconfiguration based on the second configuration recommendations. For example, the A.I. core 108 illustrated in FIG. 1 may instruct the access points in the portion of the Wi-Fi network, to undergo a second reconfiguration based on the second configuration recommendations generated by the A.I. core 108.

According to some examples, the method includes determining a number of changes in the second configuration recommendations at decision block 612. For example, the A.I. core 108 illustrated in FIG. 1 may determine a number of changes in the second configuration recommendations. The number of changes in the second configuration recommendations is a number of channel changes, channel width changes, or transmission power changes.

According to some examples, the method includes determining if the number of changes determined in 612 is above a threshold at decision block 614. For example, the A.I. core 108 illustrated in FIG. 1 may determine based on the number of changes at block 612, that the number of changes exceeds a reconfiguration threshold.

According to some examples, the method includes repeating a cycle of the determining second configuration recommendations and the instructing the access points in the portion of Wi-Fi network to undergo the second reconfiguration at block 616. For example, the A.I. core 108 illustrated in FIG. 1 may repeat a cycle of the determining second configuration recommendations and the instructing the access points in the portion of Wi-Fi network to undergo the second reconfiguration.

According to some examples, the method includes returning to a conservative convergence RRM mode at block 618. For example, the A.I. core 108 illustrated in FIG. 1 may return to a conservative convergence RRM mode.

Figure 7:
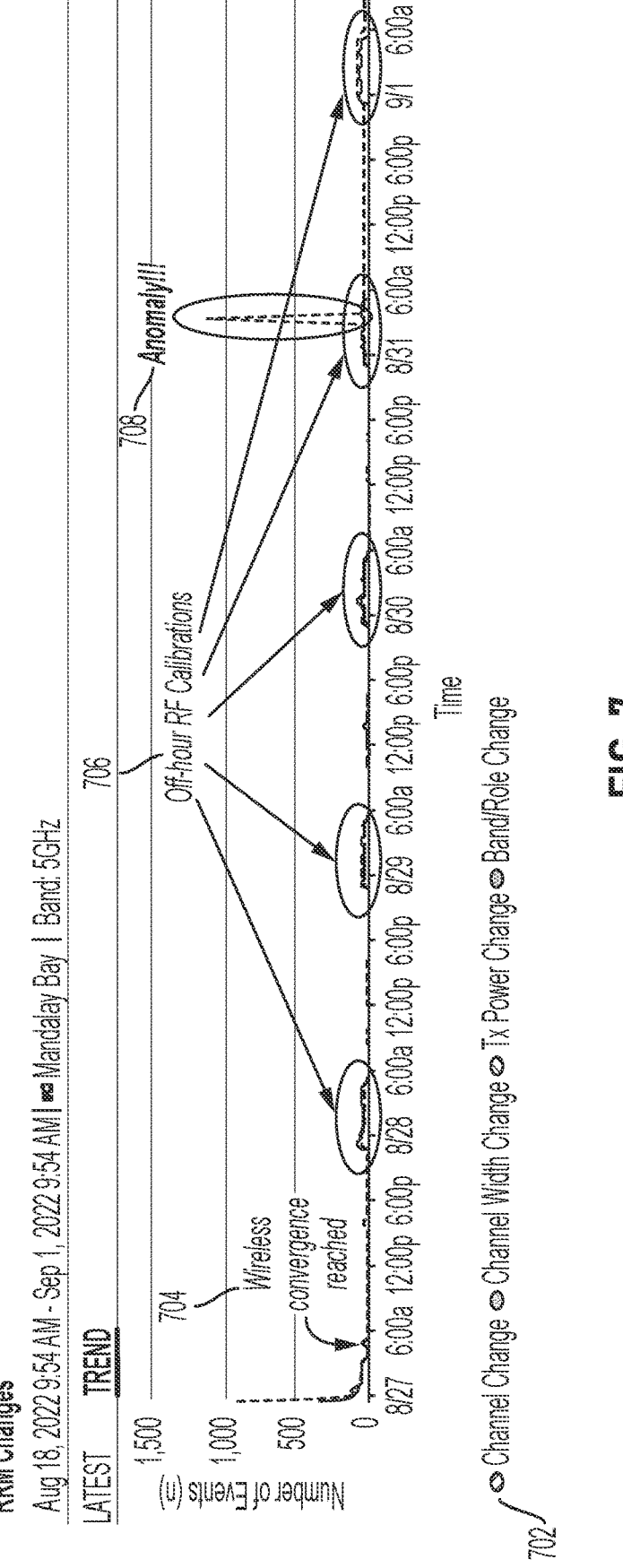
FIG. 7 illustrates an example diagram of RRM convergence changes according to some aspects of the present technology.

FIG. 7 illustrates an example diagram 700 of RRM convergence changes, according to some aspects of the present technology.

FIG. 7 illustrates changes channel, channel width, transmit power, and frequency band by APs over time. When the WLAN has initially started up a large number of configuration changes are made until wireless convergence 704 has been reached. During start up, RRM operates in an aggressive convergence RRM mode. Convergence can be achieved once the number of changes made in each update cycle drops below a threshold.

After convergence has been achieved, the RRM switches to a conservative convergence RRM mode. During this stage, the network has a high hysteresis parameter which functions to discourage or bias against significant RRM operations during busy periods for the network. As illustrated in FIG. 7 most RRM operations occur during off hours, as illustrated by the off-hour RF calibrations 706.

If any significant anomalies 708 are detected, the KPIs 702 can indicate that a reconfiguration threshold has been exceeded, suggesting that a significant event has occurred. This exceeding of the reconfiguration threshold triggers an RRM operation to transition from conservative convergence RRM mode to aggressive convergence RRM mode, where more aggressive operations are performed to rectify the issue.

Figure 8:
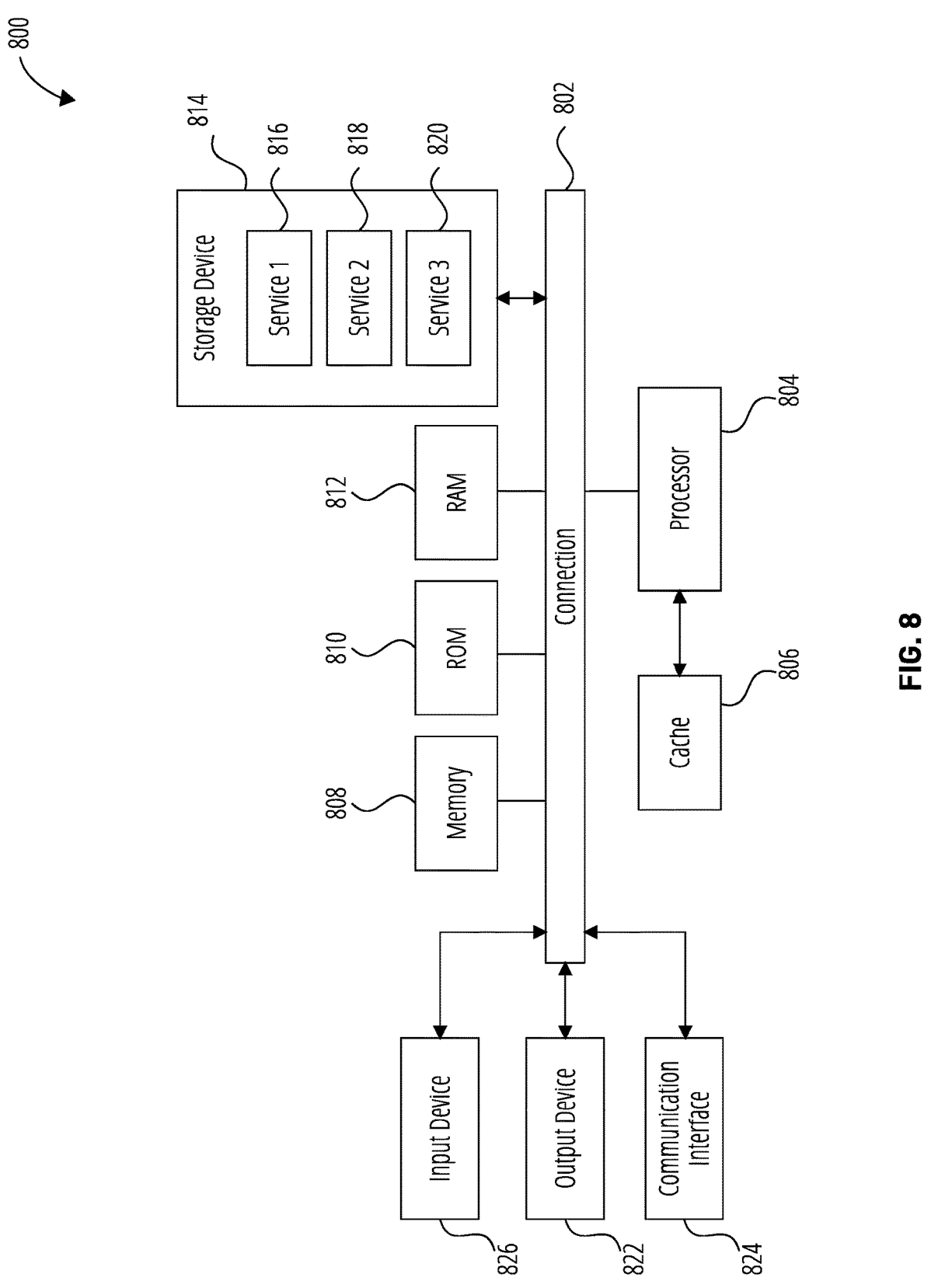
FIG. 8 illustrates an example of a computing system according to some aspects of the present technology.

FIG. 8 shows an example of computing system 800, which can be for example any computing device making up the system network 100 of FIG. 1, or any component thereof in which the components of the system are in communication with each other using connection 802. Connection 802 can be a physical connection via a bus, or a direct connection into processor 804, such as in a chipset architecture. Connection 802 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 800 includes at least one central processing unit (CPU) or processor 804 and connection 802 that couples various system components including system memory 808, such as read-only memory (ROM) 810 and random-access memory (RAM) 812 to processor 804. Computing system 800 can include a cache of high-speed memory 806 connected directly with, in close proximity to, or integrated as part of processor 804.

Processor 804 can include any general-purpose processor and a hardware service or software service, such as services 816, 818, and 820 stored in storage device 814, configured to control processor 804 as well as a special-purpose processor where software instructions are incorporated into the actual processor design. Processor 804 may essentially be a completely self-contained computing system, containing multiple cores or processors, a bus, memory controller, cache, etc. A multi-core processor may be symmetric or asymmetric.

To enable user interaction, computing system 800 includes an input device 826, which can represent any number of input mechanisms, such as a microphone for speech, a touch-sensitive screen for gesture or graphical input, keyboard, mouse, motion input, speech, etc. Computing system 800 can also include output device 822, which can be one or more of a number of output mechanisms known to those of skill in the art. In some instances, multimodal systems can enable a user to provide multiple types of input/output to communicate with computing system 800. Computing system 800 can include communication interface 824, which can generally govern and manage the user input and system output. There is no restriction on operating on any particular hardware arrangement, and therefore the basic features here may easily be substituted for improved hardware or firmware arrangements as they are developed.

Storage device 814 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 814 can include software services, servers, services, etc., that when the code that defines such software is executed by the processor 804, it causes the system to perform a function. In some embodiments, a hardware service that performs a particular function can include the software component stored in a computer-readable medium in connection with the necessary hardware components, such as processor 804, connection 802, output device 822, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method for monitoring, by a network controller, health of a wireless network for radio resource management (RRM) operation, comprising: monitoring telemetry of a plurality of access points in a network, wherein said monitoring includes measuring at least two parameters including a change in a power level and a health score of the access points; determining convergence of the network when the power level has dropped below a predetermined threshold; triggering a recalibration of the network when the health score for each access point within the network has reduced below the predetermined threshold during a time period; and initiating a switch from a steady state to a startup state based on the two monitored parameters.

Aspect 2. The method of Aspect 1, wherein the recalibration is initiated when the health score for each access point within the network has reduced below a percentage of the predetermined threshold during the time period.

Aspect 3. The method of any of Aspects 1 to 2, wherein triggering the recalibration is caused by power failure, a system restart, or a change in network configuration.

Aspect 4. The method of any of Aspects 1 to 3, wherein triggering the recalibration is caused by a sensitivity score of the network, said sensitivity score controlling a tolerance level of changes to one or more access points in the network.

Aspect 5. The method of any of Aspects 1 to 4, wherein triggering the recalibration is caused by detecting one or more anomalies, the detection configured to identify a number of successive RRM power updates during the predetermined time period.

Aspect 6. The method of any of Aspects 1 to 5, wherein triggering the recalibration is caused by detecting a change in network configurations of the network caused by: a performance level of one or more access points reducing below a predetermined threshold; and a change in cell size of a portion of the access points.

Aspect 7. The method of any of Aspects 1 to 6, further comprising: determining a startup state cycle duration based on a number of the changes in the power level of the access points below the predetermined threshold during the time period.

Aspect 8. The method of any of Aspects 1 to 7, further comprising: monitoring a health score index of each of the plurality of access points, the health score index configured to indicate when at least one key performance indicator of the health score is below a threshold.

Aspect 9. A network device comprising one or more memories having computer-readable instructions stored therein; and one or more processors configured to execute the computer-readable instructions to: monitor telemetry of a plurality of access points in a network, wherein said monitoring includes measuring at least two parameters including a change in a power level and a health score of the access points; determine convergence of the network when the power level has dropped below a predetermined threshold; trigger a recalibration of the network when the health score for each access point within the network has reduced below the predetermined threshold during a time period; and initiate a switch from a steady state to a startup state based on the two monitored parameters.

Aspect 10. The network device of Aspect 9, wherein the recalibration is initiated when the health score for each access point within the network has reduced below a percentage of the predetermined threshold during the time period.

Aspect 11. The network device of any of Aspects 9 to 10, wherein triggering the recalibration is caused by power failure, a system restart, or a change in network configuration.

Aspect 12. The network device of any of Aspects 9 to 11, wherein triggering the recalibration is caused by a sensitivity score of the network, say sensitivity score controlling a tolerance level of changes to one or more access points in the network.

Aspect 13. The network device of any of Aspects 9 to 12, wherein triggering the recalibration is caused by detecting one or more anomalies, identify a number of successive RRM power updates during the predetermined time period.

Aspect 14. The network device of any of Aspects 9 to 13, wherein triggering the recalibration is caused by detecting a change in network configurations of the network caused by:

a performance level of one or more access points reducing below a predetermined threshold; and a change in cell size of a portion of the access points.

Aspect 15. The network device of any of Aspects 9 to 14, wherein the processor is configured to execute the instructions and cause the processor to: determine a startup state cycle duration based on a number of the changes in the power level of the access points below the predetermined threshold during the time period.

Aspect 16. The network device of any of Aspects 9 to 15, wherein the processor is configured to execute the instructions and cause the processor to: monitor a health score index of each of the plurality of access points, the health score index configured to indicate when at least one key performance indicator of the health score is below a threshold.

Aspect 17. A non-transitory computer-readable medium comprising computer-readable instructions, which when executed by one or more processors of a network appliance, cause the network appliance to: monitor telemetry of a plurality of access points in a network, wherein said monitoring includes measuring at least two parameters including a change in a power level and a health score of the access points; determine convergence of the network when the power level has dropped below a predetermined threshold; trigger a recalibration of the network when the health score for each access point within the network has reduced below the predetermined threshold during a time period; and initiate a switch from a steady state to a startup state based on the two monitored parameters.

Aspect 18. The computer readable medium of Aspect 17, wherein the recalibration is initiated when the health score for each access point within the network has reduced below a percentage of the predetermined threshold during the time period.

Aspect 19. The computer readable medium of any of Aspects 17 to 18, wherein triggering the recalibration is caused by power failure, a system restart, or a change in network configuration.

Aspect 20. The computer readable medium of any of Aspects 17 to 19, wherein triggering the recalibration is caused by a sensitivity score of the network, say sensitivity score controlling a tolerance level of changes to one or more access points in the network.

Aspect 21. The computer readable medium of any of Aspects 17 to 20, wherein triggering the recalibration is caused by detecting one or more anomalies, identify a number of successive RRM power updates during the predetermined time period.

Aspect 22. The computer readable medium of any of Aspects 17 to 21, wherein triggering the recalibration is caused by detecting a change in network configurations of the network caused by: a performance level of one or more access points reducing below a predetermined threshold; and a change in cell size of a portion of the access points.

Aspect 23. The computer readable medium of any of Aspects 17 to 22, wherein the processor is configured to execute the computer readable medium and cause the processor to: determine a startup state cycle duration based on a number of the changes in the power level of the access points below the predetermined threshold during the time period.

Aspect 24. The computer readable medium of any of Aspects 17 to 23, wherein the processor is configured to execute the computer readable medium and cause the processor to: monitor a health score index of each of the plurality of access points, the health score index configured to indicate when at least one key performance indicator of the health score is below a threshold.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for triggering a reconfiguration of a Wi-Fi network using an aggressive convergence radio resource management (RRM) mode in a previously configured Wi-Fi network, the method comprising:

detecting that a reconfiguration threshold has been reached for at least a portion of the Wi-Fi network, the reconfiguration threshold indicating that configurations of a significant number of access points in the at least the portion of the Wi-Fi network are below a defined health-score value, to obtain a detection result; and switching, based on the detection result, to the aggressive convergence RRM mode from a conservative convergence RRM mode, wherein the aggressive convergence RRM mode comprises performing configuration cycles without waiting for a predefined maintenance interval, and wherein the conservative convergence RRM mode comprises performing configuration cycles only at predefined maintenance intervals.

2. The method of claim 1, wherein the aggressive convergence RRM mode is characterized by a low hysteresis parameter, wherein the conservative convergence RRM mode is characterized by a high hysteresis parameter, and wherein hysteresis parameters function to discourage updates to access point reconfigurations such that when a hysteresis parameter is high, less reconfigurations are made to the access points.

3. The method of claim 1, wherein the reconfiguration threshold is based on an aggregate health score for the access points in the at least the portion of the Wi-Fi network, the reconfiguration threshold being a percentage reduction in the aggregate health score for the access points in the at least the portion of the Wi-Fi network.

4. The method of claim 1, wherein the reconfiguration threshold is based on an increase in a number of channel changes or power level changes by the access points in the at least the portion of the Wi-Fi network, the reconfiguration threshold being a percentage increase in the number of the channel changes or the power level changes.

5. The method of claim 1, wherein the aggressive convergence RRM mode comprises:

determining first configuration recommendations based on information descriptive of the access points in the at least the portion of the Wi-Fi network;

instructing the access points in the at least the portion of the Wi-Fi network to undergo a first reconfiguration based on the first configuration recommendations;

receiving first telemetry from the access points in the at least the portion of the Wi-Fi network that are configured based on the first configuration recommendations;

determining second configuration recommendations based on the first telemetry and the information descriptive of the access points;

instructing the access points in the at least the portion of the Wi-Fi network to undergo a second reconfiguration based on the second configuration recommendations; and determining a number of changes in the second configuration recommendations.

6. The method of claim 5, further comprising repeating a cycle of the determining second configuration recommendations and the instructing the access points in the at least the portion of the Wi-Fi network to undergo the second reconfiguration, when the determined number of changes in the second configuration recommendations is above a threshold.

7. The method of claim 5, further comprising returning to the conservative convergence RRM mode when the determined number of changes in the second configuration recommendations is below a threshold.

8. The method of claim 5, wherein the number of changes in the second configuration recommendations is a number of channel changes, channel width changes, or transmission power changes.

9. A network device comprising:

one or more memories having computer-readable instructions stored therein; and one or more processors configured to execute the computer-readable instructions to:

detect that a reconfiguration threshold has been reached for at least a portion of a Wi-Fi network, the reconfiguration threshold indicating that configurations of a significant number of access points in the at least the portion of the Wi-Fi network are below a defined health-score value, to obtain a detection result; and switch, based on the detection result, to an aggressive convergence radio resource management (RRM) mode from a conservative convergence RRM mode, wherein the aggressive convergence RRM mode comprises performing configuration cycles without waiting for a predefined maintenance interval, and wherein the conservative convergence RRM mode comprises performing configuration cycles only at predefined maintenance intervals.

10. The network device of claim 9, wherein the aggressive convergence RRM mode is characterized by a low hysteresis parameter, wherein the conservative convergence RRM mode is characterized by a high hysteresis parameter, and wherein hysteresis parameters function to discourage updates to access point reconfigurations such that when a hysteresis parameter is high, less reconfigurations are made to the access points.

11. The network device of claim 9, wherein the reconfiguration threshold is based on an aggregate health score for the access points in the at least the portion of the Wi-Fi network, the reconfiguration threshold being a percentage reduction in the aggregate health score for the access points in the at least the portion of the Wi-Fi network.

12. The network device of claim 9, wherein the reconfiguration threshold is based on an increase in a number of channel changes or power level changes by the access points in the at least the portion of the Wi-Fi network, the reconfiguration threshold being a percentage increase in the number of the channel changes or the power level changes.

13. The network device of claim 9, wherein the aggressive convergence RRM mode comprises:

determine first configuration recommendations based on information descriptive of the access points in the at least the portion of the Wi-Fi network;

instruct the access points in the at least the portion of the Wi-Fi network to undergo a first reconfiguration based on the first configuration recommendations;

receive first telemetry from the access points in the at least the portion of the Wi-Fi network that are configured based on the first configuration recommendations;

determine second configuration recommendations based on the first telemetry and the information descriptive of the access points;

instruct the access points in the at least the portion of the Wi-Fi network to undergo a second reconfiguration based on the second configuration recommendations; and determine a number of changes in the second configuration recommendations.

14. The network device of claim 13, wherein the instructions further configure the network device to:

repeat a cycle of the determining second configuration recommendations and the instructing the access points in the at least the portion of the Wi-Fi network to undergo the second reconfiguration, when the determined number of changes in the second configuration recommendations is above a threshold.

15. The network device of claim 13, wherein the instructions further configure the network device to return to the conservative convergence RRM mode when the determined number of changes in the second configuration recommendations is below a threshold.

16. A non-transitory computer-readable medium comprising computer-readable instructions, which when executed by one or more processors of a network appliance, cause the network appliance to:

detect that a reconfiguration threshold has been reached for at least a portion of a Wi-Fi network, the reconfiguration threshold indicating that configurations of a significant number of access points in the at least the portion of the Wi-Fi network are below a defined health-score value, to obtain a detection result; and switch, based on the detection result, to an aggressive convergence radio resource management (RRM) mode from a conservative convergence RRM mode, wherein the aggressive convergence RRM mode comprises performing configuration cycles without waiting for a predefined maintenance interval, and wherein the conservative convergence RRM mode comprises performing configuration cycles only at predefined maintenance intervals.

17. The non-transitory computer-readable medium of claim 16, wherein the aggressive convergence RRM mode is characterized by a low hysteresis parameter, wherein the conservative convergence RRM mode is characterized by a high hysteresis parameter, and wherein hysteresis parameters function to discourage updates to access point reconfigurations such that when a hysteresis parameter is high, less reconfigurations are made to the access points.

18. The non-transitory computer-readable medium of claim 16, wherein the reconfiguration threshold is based on an aggregate health score for the access points in the at least the portion of the Wi-Fi network, the reconfiguration threshold being a percentage reduction in the aggregate health score for the access points in the at least the portion of the Wi-Fi network.

19. The non-transitory computer-readable medium of claim 16, wherein the reconfiguration threshold is based on an increase in a number of channel changes or power level changes by the access points in the at least the portion of the Wi-Fi network, the reconfiguration threshold being a percentage increase in the number of the channel changes or the power level changes.

20. The non-transitory computer-readable medium of claim 16, wherein the aggressive convergence RRM mode comprises:

determine first configuration recommendations based on information descriptive of the access points in the at least the portion of the Wi-Fi network;

instruct the access points in the at least the portion of the Wi-Fi network to undergo a first reconfiguration based on the first configuration recommendations;

receive first telemetry from the access points in the at least the portion of the Wi-Fi network that are configured based on the first configuration recommendations;

determine second configuration recommendations based on the first telemetry and the information descriptive of the access points;

instruct the access points in the at least the portion of the Wi-Fi network to undergo a second reconfiguration based on the second configuration recommendations; and determine a number of changes in the second configuration recommendations.

* * * * *